United States Patent [19]

Okamoto et al.

[11] Patent Number: 5,183,681
[45] Date of Patent: Feb. 2, 1993

[54] METHOD FOR PREPARING RETORT TOFU

[75] Inventors: Hidefumi Okamoto, Sakai; Koji Sengoku, Nara, both of Japan

[73] Assignee: House Food Industrial Co., Ltd., Osaka, Japan

[21] Appl. No.: 691,835

[22] Filed: Apr. 26, 1991

[30] Foreign Application Priority Data

May 7, 1990 [JP] Japan .................. 2-117053

[51] Int. Cl.$^5$ .............................. A23L 1/20
[52] U.S. Cl. .................... 426/634; 426/495; 426/521; 426/656
[58] Field of Search ............... 426/634, 656, 495, 521

[56] References Cited

U.S. PATENT DOCUMENTS

| 4,732,774 | 3/1988 | Sugisawa et al. | 426/634 |
| 4,791,001 | 12/1988 | Matsuura et al. | 426/634 |
| 4,971,825 | 11/1990 | Kitazume et al. | 426/634 |

FOREIGN PATENT DOCUMENTS

| 59-88058 | 5/1984 | Japan . |
| 60-87751 | 3/1985 | Japan . |
| 60-149354 | 8/1985 | Japan . |
| 61-58551 | 3/1986 | Japan . |
| 62-257358 | 11/1987 | Japan . |
| 63-304961 | 12/1988 | Japan . |

Primary Examiner—Jeanette Hunter
Assistant Examiner—Helen Pratt
Attorney, Agent, or Firm—Oblon, Spivak, McClelland, Maier & Neustadt

[57] ABSTRACT

A method for preparing retort Tofu comprises the steps of adding a coagulating agent to soy milk obtained by removing bean-curd refuse from Go, charging the mixture in a heat-resistant container, closely sealing the container and then subjecting the sealed container to a retort treatment, wherein the content of insoluble solids present in the soy milk is controlled to not more than 3% by weight on the basis of the total weight of the soy milk. The Tofu obtained according to the foregoing method can be stored for a long time period since it is subjected to the retort treatment. In addition, the Tofu thus obtained has resiliency almost comparable to that for the usual Tofu and good taste, although it is retort-treated.

15 Claims, No Drawings

METHOD FOR PREPARING RETORT TOFU

BACKGROUND OF THE INVENTION

The present invention relates to a method for preparing retort Tofu capable of withstanding a long term storage and in particular to a method for preparing retort Tofu excellent in resiliency.

There have been proposed a variety of methods for preparing so-called retort Tofu which comprise charging soy milk, to which a coagulating agent is added, in a heat-resistant container, sealing the container and then subjecting the container to a retort treatment to thus simultaneously sterilize and coagulate the soybean milk and to thereby form Tofu in the sterilized state. For instance, Japanese Patent Unexamined Publication (hereunder referred to as "J. P. KOKAI") No. Sho 60-149354 discloses, in Example 1, a method for preparing retort Tofu using soy milk passed through a 100 mesh sieve and J. P. KOKAI No. Sho 63 304961 discloses a method for preparing retort Tofu which comprises a great amount of insoluble particles having a particle size of not more than 150μ. Moreover, there are disclosed methods for preparing retort Tofu in J.P. KOKAI Nos. Sho 59-88058, Sho 60-87751, Sho 61-58551 and Sho 62-257358.

However, when the Tofu is subjected to a retort sterilization treatment in which the Tofu is treated at a high temperature of 110° C. or higher and a high pressure in order to impart long term storability to the Tofu, the foregoing methods suffer from a problem that they can provide only Tofu having low quality and low resiliency.

SUMMARY OF THE INVENTION

Accordingly, an object of the present invention is to provide a method which makes it possible to provide retort Tofu having high quality and excellent resiliency.

This and other objects of the present invention will be apparent from the following description and Examples.

The present invention has been completed on the basis of a finding that if there is used, as a starting material, soy milk from which fine particles of bean-curd refuse called Mijin (mite) remaining in the soy milk are removed, the presence thereof never causing any problem in the preparation of the usual Tofu which is not subjected to a treatment performed at a high temperature of 110° C or higher and a high pressure (i.e., retort treatment), such soy milk can specifically provide Tofu exhibiting good resiliency in the preparation of retort Tofu.

Consequently, the present invention relates to a method for preparing retort Tofu which comprises the steps of providing soy milk by removing bean-curd refuse from Go, adding a coagulating agent to the soy milk, charging the mixture in a heat-resistant container, closely sealing the container and then subjecting the sealed container to a retort treatment, wherein the content of insoluble solids present in the soy milk is controlled to not more than 3% by weight on the basis of the total weight of the soy milk.

DESCRIPTION OF THE PREFERRED EMBODIMENTS

The soy milk used in the present invention can be prepared in the usual manner. For instance, the soy milk can be prepared according to a series of the following processes: (starting material) → immersion of the starting material in water → addition of water to the material → grinding of the mixture (formation of Go) →, heat treatment of the Go → separation of bean-curd refuse from the Go → (soy milk) →, cooling, using entire soybean or milled soybean as a starting material. Alternatively, the soy milk can optionally be prepared by directly transferring the "Go" to the separation process in the foregoing series of processes while omitting the heat treatment. In this case, however, it is necessary to carry out a heat treatment after the process for separating the bean-curd refuse, i.e., the "soy milk" should be heat-treated. Such a heat treatment serves to cause heat-denaturation of proteins present in the soy milk to a proper extent, to hence enhance the water retention of the resulting Tofu and further to make the Tofu good palate to the tongue. The heat treatment is desirably carried out, for instance, at a temperature ranging from about 80° C. to 100° C. for about 30 seconds to 10 minutes.

Moreover, it is also possible in the method of the present invention to use so-called powdered soy milk which can be prepared by subjecting the foregoing soy milk to a treatment such as spray-drying to form powder or granules thereof. In this case, the powdery soy milk is dispersed or dissolved in water or hot water prior to use in the foregoing processes for making Tofu.

In the method of the present invention, it is preferred to use soy milk having a dry solid content ranging from 8 to 13% by weight and preferably 10 to 12% by weight.

Any conventionally known coagulating agents for the Tofu can be used, as the coagulating agents, in the method of this invention. Examples thereof include lactones such as glucono-δ-lactone (hereunder referred to as "G.D.L."); and divalent metal salts such as calcium sulfate. These coagulating agents may be used alone or in any combination. The amount of the coagulating agent to be added to the preferably 0.15 to 0.3 part by weight per 100 parts by weight of the soy milk used.

The coagulating agents are used in the usual manner. More , specifically, a powdery coagulating agent may be directly added to the soy milk or may be dissolved in water in advance and then added to the soy milk in the form of a solution.

Incidentally, it is desirable that the progress of the coagulation of the soy milk be inhibited as much as possible prior to the retort treatment in order to make the texture of the resulting Tofu more uniform. In this respect, it is desirable that the temperature of the soy milk be adjusted to the range of from 5° C. to 30° C. when the soy milk is mixed with a coagulating agent. In particular, when the soy milk is mixed with a coagulating agent prior to charging it in a container and a quick-acting coagulating agent such as calcium sulfate is employed, it is desirable to cool the soy milk within the range of 5° C. to 20° C. or to add a coagulation-retarder such as a polyphosphoric acid salt, for instance, sodium pyrophosphate and sodium polyphosphate, in advance, so that the progress of the coagulation can be inhibited and the charging operation is not hindered at all.

In the present invention, a heat-resistant container in which a mixture of the soy milk and a coagulating agent is charged is closely sealed and then subjected to a retort treatment for simultaneously carrying out the coagulation and sterilization of the soy milk.

Examples of the containers in which the soy milk is charged are heat-resistant containers obtained by forming, into a desired shape, synthetic resins capable of withstanding the retort treatment such as polypropylene, polyvinylidene chloride and ethylene vinyl alcohol resin.

As heat transfer mediums used in the retort treatment, there may be used, for instance, those commonly used in the retort treatment such as water vapor and hot water. The conditions for the retort treatment are selected such that the retort-treated bean curd can be stored at ordinary temperature for a long time period and more specifically the retort treatment is carried out at a temperature ranging from 110° C. to 130° C. for 5 to 100 minutes.

The method of the present invention is characterized in that there is used the soy milk whose insoluble solid content is not more than 3% by weight and preferably not more than 2% by weight on the basis of the total weight of the soy milk, as a starting material. In this respect, the term "insoluble solid content" herein used means fine particles of bean-curd refuse called Mijin which remain in the soy milk even after the bean-curd refuse is removed from the Go.

In the present invention, the amount of the insoluble solids included in the soy milk can be determined, for instance, by centrifuging the soy milk at 1690×g for 3 minutes using a High Speed Cooling Centrifuge CR20B2 (available from Hitachi Ltd.) and weighing the resulting solid residue. More specifically, 500 g of soy milk is charged in a centrifuge tube and centrifuged under the conditions defined above. After the centrifugation, the resulting supernatant is removed, the centrifuge tube is stood upside down, the tube is maintained in this state for 5 minutes and then the weight (which is assumed to be A g) of the centrifuge tube to which the insoluble solids are adhered is determined to obtain the insoluble solid content on the basis of the following relation:

(A g−the weight of the vacant centrifuge tube)×100/500(%)

In the present invention, the insoluble solid content of the soy milk can be adjusted to not more than 3% by weight on the basis of the total weight of the soy milk by, for instance, filtering or centrifuging the soy milk. For example, the soy milk is preferably filtered through a sieve having a pore size of 150 mesh or finer. Alternatively, it is preferable that the soy milk be centrifuged at a centrifugal force of not less than 3000×g for 3 to 20 seconds.

In the present invention, if soy milk having an insoluble solid content of more than 3% by weight is used, Tofu having good resiliency cannot be obtained at all.

The Tofu obtained according to the method of this invention can be stored for a long time period since it is subjected to the retort treatment. In addition, the Tofu obtained by the present invention has resiliency almost comparable to that for the usual Tofu and good taste although it is retort-treated.

The method of the present invention will hereunder be explained in more detail with reference to the following non-limitative working Examples and the effects practically attained by the present invention will also be discussed in detail in comparison with Comparative Examples given below.

REFERENCE EXAMPLE 1

6 kg of entire soybean was immersed in water at room temperature for 15 hours, then 26 kg of water was added to the soaked soybean and the soybean was milled or ground. Then the milled product (Go) was heated for 5.5 minutes till the temperature thereof reached 98° C. and then introduced into a pressing apparatus for separating bean-curd refuse equipped with a 80 mesh sieve (Model FM-3-C available from Takai Seisakusho) to separate bean-curd refuse.

The soy milk obtained through the separation of the bean-curd refuse was cooled down to 20° C. Subsequently, 2.8 g of G.D.L. as a coagulating agent was added to and mixed with 1 kg of the soy milk which had been subjected to the foregoing treatments (the insoluble solids present in the soy milk was 4.2%) and 150 g each of the resulting mixture was charged in a polypropylene container. Then the containers were sealed and subjected to hot water sterilization at 90° C. for 40 minutes to thus give usual bean curd.

EXAMPLE 1

The soy milk obtained in Reference Example 1 was further filtered through a 325 mesh vibrating filter and cooled down to 20° C. Subsequently, 2.0 g of G.D.L. as a coagulating agent was added to and mixed with 1 kg of the soy milk which had been subjected to the foregoing filtration treatment (the insoluble solids present in the soy milk was 1.3%) and 50 g each of the resulting mixture was charged in a polypropylene container. Then the containers were sealed and subjected to a retort treatment (using water vapor) at 121° C. for 22 minutes to thus give retort Tofu.

EXAMPLE 2

The same procedures used in Example 1 were repeated except that soy milk (the insoluble solids present in the soy milk was 3.0%) which had been filtered through a 150 mesh vibrating filter instead of the 325 mesh vibrating filter used in Example 1 was used to give retort Tofu.

COMPARATIVE EXAMPLE 1

The same procedures used in Example 1 were repeated except that soy milk (the insoluble solids present in the soy milk was 4.2%) obtained in Reference Example 1 was used to give retort Tofu.

COMPARATIVE EXAMPLE 2

The same procedures used in Example 1 were repeated except that soy milk (the insoluble solids present in the soy milk was 3.3%) which had been filtered through a 120 mesh vibrating filter instead of the 325 mesh vibrating filter used in Example 1 was used to give retort Tofu.

The resiliency (brittleness) of the Tofu obtained in Reference Example 1 and 2 and Comparative Examples 1 and 2 were evaluated. The results obtained are summarized in the following Table 1. The numerical values in the column of the "brittleness" given in Table 1 are the average of the evaluation by 15 panelists on the basis of the following criteria:

| Criteria |
| --- |
| 1: no resiliency and high brittleness. |
|  |

-continued

| Criteria |
| --- |
| 5: high resiliency and low brittleness. |

In this connection, the insoluble solid content of each soy milk listed in Table 1 was determined by the following method. Apparatus used: High Speed Cooling Centrifuge CR20B2 (Hitachi Ltd.) Conditions for Centrifugation: $1690 \times g$; 3 minutes.

Method for Determining the insoluble Solid Content 500 g of soy milk was introduced into a centrifuge tube, centrifuged under the foregoing conditions and the resulting supernatant was removed. Then the centrifuge tube was stood upside down and maintained in this state for 5 minutes, then the weight of the tube (this was assumed to be A g) to which insoluble solids were adhered was determined and the insoluble solid content was obtained from the following relation:

(A g—the weight of the vacant tube) $\times 100/500$ (%)

TABLE 1

| | Insoluble Solid Content (mesh of Sieve) | Treating Conditions | Brittleness (Sensory Test) |
| --- | --- | --- | --- |
| Rf. Ex. 1 (Control) | 4.2%; (80 mesh) | 90° C.; for 40 min. | 4.7 |
| Ex. 1 | 1.3%; (325 mesh) | 121° C.; for 22 min. | 4.5 |
| Ex. 2 | 3.0%; (150 mesh) | 121° C.; for 22 min. | 3.6 |
| Comp. Ex. 1 | 4.2%; (80 mesh) | 121° C.; for 22 min. | 1.3 |
| Comp. Ex. 2 | 3.3%; (120 mesh) | 121° C.; for 22 min. | 2.3 |

What is claimed is:

1. A method for preparing retort tofu comprising the steps of adding a coagulating agent to soy milk obtained by removing bean-curd refuse from refuse from a mixture of ground soybean and water, charging the mixture in a heat-resistant container, closely sealing the container and then subjecting the sealed container to a retort treatment, wherein a content of insoluble solids present in the soy milk is controlled to not more than 3% by weight on the basis of the total weight of the soy milk when the content of insoluble solids is determined by centrifuging the soy milk at $1690 \times g$ for 3 minutes whereby said controlled amounts of insoluble solids results in a product with increased resiliency.

2. The method of claim 1 wherein the content of the insoluble solids present in the soy milk is controlled to not more than 2% by weight on the basis of the total weight of the soy milk.

3. The method of claim 1 wherein the content of the insoluble solids present in the soy milk is controlled by filtering it through a sieve having a pore size of 150 mesh or finer.

4. The method of claim 1 wherein the soy milk is obtained by removing bean-curd refuse from the mixture of ground soybean and water and filtering it through a sieve having a pore size of 150 mesh or finer.

5. The method of claim 1 wherein the soy milk is subjected to a heat treatment at about 80° C. to 100° C. for about 30 seconds to 10 minutes.

6. The method of claim 1 wherein the soy milk used has a dry solid content ranging from 8 to 13% by weight.

7. The method of claim 6 wherein the soy milk used has a dry solid content ranging from 10 to 12% by weight.

8. The method of claim 1 wherein the amount of the coagulating agent added to the soy milk ranges from 0.1 to 0.5 part by weight per 100 parts by weight of the soy milk.

9. The method of claim 8 wherein the amount of the coagulating agent added to the soy milk ranges from 0.15 to 0.3 part by weight per 100 parts by weight of the soy milk.

10. The method of claim 1 wherein the temperature of the soy milk is adjusted to the range of from 5° C. to 30° C. when it is mixed with the coagulating agent.

11. The method of claim 1 wherein the coagulating agent is a quick-acting type one and the temperature of the soy milk is adjusted to the range of from 5° C. to 20° C. when it is mixed with the coagulating agent.

12. The method of claim 1 wherein the coagulating agent is a quick-acting type one and a polyphosphoric acid salt comprising sodium pyrophosphate or sodium polyphosphate is added to the soy milk as a coagulation retarder when it is mixed with the coagulating agent.

13. The method of claim 1 wherein the retort treatment is carried out at a temperature ranging from 110° C. to 130° C. for 5 to 100 minutes.

14. The method of claim 1 wherein the mixture of ground soybean and water is obtained by grinding soybean in the presence of water.

15. A method for preparing retort tofu comprising the steps of adding a coagulating agent to soy milk obtained by removing bean-curd refuse from a mixture of ground soybean and water, charging the mixture in a heat-resistant container, closely sealing the container and then subjecting the sealed container to a retort treatment, wherein the content of insoluble solids present in the soy milk is controlled to not more than 3% by weight on the basis of the total weight of the soy milk when the content of insoluble solids is determined by centrifuging the soy milk at $1690 \times g$ for 3 minutes, wherein the content of the insoluble solids is controlled by filtering it through a sieve having a pore size of 150 mesh or finer or centrifuging it at a centrifugal force of not less than $3000 \times g$ for three to twenty seconds whereby said controlled amounts of insoluble solids results in a product with increased resiliency.

* * * * *